(12) United States Patent
Ding

(10) Patent No.: US 12,063,429 B2
(45) Date of Patent: Aug. 13, 2024

(54) IMAGE COLLECTION METHOD AND APPARATUS, AND ELECTRONIC DEVICE

(71) Applicant: VIVO MOBILE COMMUNICATION CO., LTD., Dongguan (CN)

(72) Inventor: Song Ding, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 85 days.

(21) Appl. No.: 18/082,573

(22) Filed: Dec. 15, 2022

(65) Prior Publication Data

US 2023/0123474 A1 Apr. 20, 2023

Related U.S. Application Data

(63) Continuation of application No. PCT/CN2021/101162, filed on Jun. 21, 2021.

(30) Foreign Application Priority Data

Jun. 24, 2020 (CN) .......................... 202010589107.X

(51) Int. Cl.
*H04N 23/54* (2023.01)
*H04N 23/45* (2023.01)
(Continued)

(52) U.S. Cl.
CPC ............ *H04N 23/54* (2023.01); *H04N 23/45* (2023.01); *H04N 23/51* (2023.01); *H04N 23/57* (2023.01)

(58) Field of Classification Search
None
See application file for complete search history.

(56) References Cited

U.S. PATENT DOCUMENTS

2016/0295095 A1 10/2016 Jannard et al.
2020/0336575 A1* 10/2020 Li .................... F16M 11/046
(Continued)

FOREIGN PATENT DOCUMENTS

CN  101266394 A    9/2008
CN  106686291 A *  5/2017
(Continued)

OTHER PUBLICATIONS

International Search Report issued in corresponding International Application No. PCT/CN2021/101162, mailed Sep. 9, 2021, 4 pages.
(Continued)

*Primary Examiner* — Paul M Berardesca
(74) *Attorney, Agent, or Firm* — IPX PLLC

(57) ABSTRACT

An image collection method and apparatus, and an electronic device are provided. The electronic device includes: a housing provided with a light transmission hole and an opening, where the light transmission hole and the opening are respectively disposed on adjacent first and second sides of the housing; a camera module including a first camera module and a second camera module disposed in the housing; and a driving mechanism connected to the camera module and configured to drive the camera module to move between a first position and a second position. When the camera module is located at the first position, the first camera is opposite to the light transmission hole. When the camera module is located at the second position, the first camera at least partially extends out of the housing from the opening. The second camera is opposite to the light transmission hole.

12 Claims, 8 Drawing Sheets

(51) Int. Cl.
    *H04N 23/51*     (2023.01)
    *H04N 23/57*     (2023.01)

(56) References Cited

U.S. PATENT DOCUMENTS

| | | | | |
|---|---|---|---|---|
| 2020/0336635 | A1* | 10/2020 | Zhou | F16M 11/046 |
| 2021/0014346 | A1* | 1/2021 | Choi | H04M 1/0277 |
| 2021/0136284 | A1* | 5/2021 | Gopalakrishna | H04N 23/75 |
| 2022/0182520 | A1* | 6/2022 | Jun | H04N 23/54 |

FOREIGN PATENT DOCUMENTS

| | | | | | |
|---|---|---|---|---|---|
| CN | 108769485 A | * | 11/2018 | | |
| CN | 108769515 A | | 11/2018 | | |
| CN | 109714456 A | | 5/2019 | | |
| CN | 109803074 A | | 5/2019 | | |
| CN | 109862240 A | | 6/2019 | | |
| CN | 110113455 A | * | 8/2019 | | H04M 1/0264 |
| CN | 110278362 A | | 9/2019 | | |
| CN | 110471496 A | * | 11/2019 | | |
| CN | 110707417 A | | 1/2020 | | |
| CN | 111064874 A | * | 4/2020 | | H04N 5/2251 |
| CN | 111083382 A | | 4/2020 | | |
| CN | 111726500 A | | 9/2020 | | |
| JP | 2002196203 A | | 7/2002 | | |

OTHER PUBLICATIONS

First Office Action issued in related Chinese Application No. 202010589107.X, mailed Apr. 27, 2021, 6 pages.
Jun Gao "AI assistant + black body LeTV new machine exposure", Computer and Network, Apr. 26, 2017.

* cited by examiner

IMAGE COLLECTION METHOD AND APPARATUS, AND ELECTRONIC DEVICE

CROSS-REFERENCE TO RELATED APPLICATIONS

This application is a continuation of International Application No. PCT/CN2021/101162, filed Jun. 21, 2021, which claims priority to Chinese Patent Application No. 202010589107.X, filed Jun. 24, 2020. The entire contents of each of the above-referenced applications are expressly incorporated herein by reference.

TECHNICAL FIELD

This application pertains to the technical field of electronic devices, and in particular to an image collection method and apparatus, and an electronic device.

BACKGROUND

At present, functions of mobile phones are becoming increasingly powerful, and users have increasingly greater demands for photographing experience of mobile phones as well as previous calling and Internet functions. Therefore, due to high pixel requirements for cameras of current mobile phones, the cameras can meet increasingly higher requirements, and the mobile phones have developed from a single camera to multiple cameras, which brings more photographing fun and new user experience, and has become a current development direction.

However, a user does not need all cameras eagerly while using a rear camera. The user uses a rear main camera and one of all cameras (such as a wide-angle camera) most commonly, but does not need other cameras eagerly. A current mobile phone is designed as shown in FIG. 1, in which an opening is disposed for each rear camera. In addition, a position of a camera decoration part protrudes from a back cover greatly and occupies a large area. Specifically, excessive openings disposed at positions of rear cameras and a large convex area of at the position of the camera decoration part will wholly affect the structural strength of a housing, causing the housing to break or deform easily.

SUMMARY

Embodiments of this application are intended to provide an image collection method and apparatus, and an electronic device.

According to a first aspect, an embodiment of this application provides an electronic device, including:
a housing, where the housing is provided with a light transmission hole and an opening, the light transmission hole is disposed on a first side of the housing, the opening is disposed on a second side of the housing, and the first side and the second side are adjacent sides;
a camera module disposed in the housing, where the camera module includes a first camera and a second camera; and
a driving mechanism, connected to the camera module and configured to drive the camera module to move between a first position and a second position,
where in a case that the camera module is located at the first position, the first camera is opposite to the light transmission hole; and in a case that the camera module is located at the second position, the first camera at least partially extends out of the housing from the opening, and the second camera is opposite to the light transmission hole.

According to a second aspect, an embodiment of this application provides an image collection method, applied to the foregoing electronic device and including:
receiving a first input; and
controlling, in response to the first input, a camera module of the electronic device to move from a first position to a second position; and
collecting an image through a first camera in the camera module and/or a second camera in the camera module.

According to a third aspect, an embodiment of this application provides an image collection apparatus, applied to the foregoing electronic device and including:
a first receiving module, configured to receive a first input;
a first control module, configured to control, in response to the first input, a camera module of the electronic device to move from a first position to a second position; and
a first collection module, configured to collect an image through a first camera in the camera module and/or a second camera in the camera module.

According to a fourth aspect, an embodiment of this application provides an electronic device, where the electronic device includes a processor, a memory, and a program or an instruction that is stored in the memory and that can be run on the processor, and when the program or the instruction is executed by the processor, the steps of the method according to the second aspect are implemented.

According to a fifth aspect, an embodiment of this application provides a readable storage medium, where the readable storage medium stores a program or an instruction, and when the program or the instruction is executed by a processor, the steps of the method in the second aspect are implemented.

According to a sixth aspect, an embodiment of this application provides a chip, where the chip includes a processor and a communications interface, the communications interface is coupled to the processor, and the processor is configured to run a program or an instruction to implement the method in the second aspect.

In an embodiment of this application, by disposing a housing, where the housing is provided with a light transmission hole and an opening, the light transmission hole is disposed on a first side of the housing, the opening is disposed on a second side of the housing, and the first side and the second side are adjacent sides; a camera module disposed in the housing, where the camera module includes a first camera and a second camera; and a driving mechanism, connected to the camera module and configured to drive the camera module to move between a first position and a second position, where in a case that the camera module is located at the first position, the first camera is opposite to the light transmission hole; and in a case that the camera module is located at the second position, the first camera at least partially extends out of the housing from the opening, and the second camera is opposite to the light transmission hole, openings can be disposed for only some cameras, and the remaining cameras can be hidden in the housing. Therefore, openings at camera positions and a convex area of a camera decoration part can be reduced, the structural strength of the housing can be increased, a possibility of breaking or deformation can be reduced, and a processing technology can be simplified.

DETAILED DESCRIPTION

Figure 1:
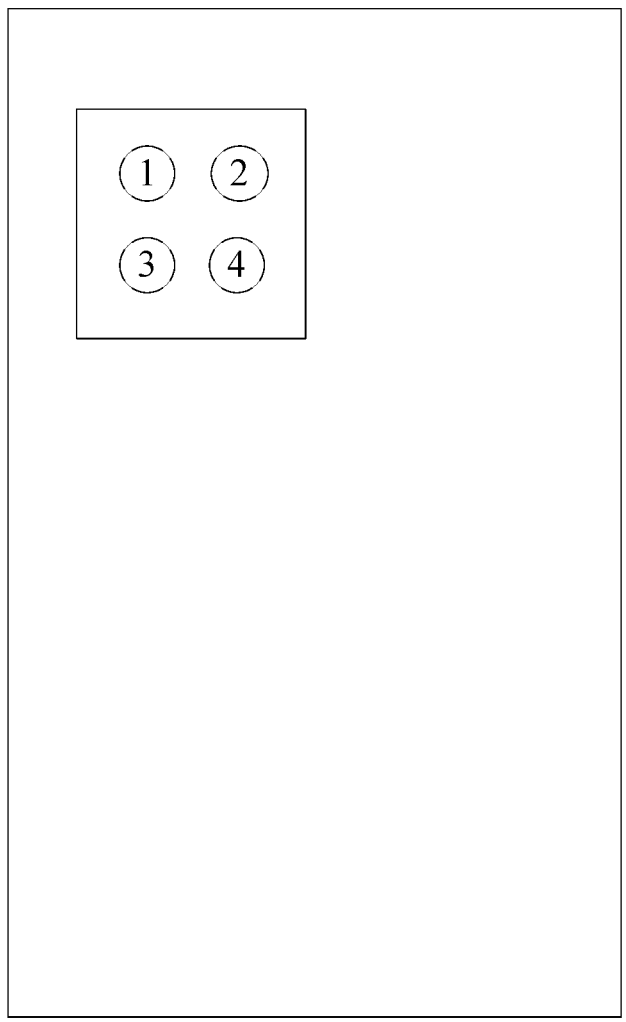
FIG. 1 is a schematic structural diagram of an electronic device in the prior art.

The following clearly describes the technical solutions in the embodiments of this application with reference to the accompanying drawings in the embodiments of this application. The described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

The following describes an image collection method and apparatus, and an electronic device provided in embodiments of this application through embodiments and application scenarios thereof with reference to the accompanying drawings.

In view of the foregoing technical problem, this application provides an electronic device, as shown in FIG. 2 to FIG. 6, including:

a housing 1, where the housing 1 is provided with a light transmission hole 2 and an opening 3, the light transmission hole 2 is disposed on a first side of the housing 1, the opening 3 is disposed on a second side of the housing 1, and the first side and the second side are adjacent sides;

a camera module 4 disposed in the housing 1, where the camera module 4 includes a first camera 7 and a second camera 8;

a driving mechanism 6, connected to the camera module 4 and configured to drive the camera module 4 to move between a first position and a second position;

where in a case that the camera module 4 is located at the first position, the first camera 7 is opposite to the light transmission hole 2; and in a case that the camera module 4 is located at the second position, the first camera 7 at least partially extends out of the housing 1 from the opening 3, and the second camera 8 is opposite to the light transmission hole 2.

The first camera 7 may include at least one camera, and the second camera 8 may also include at least one camera. The first camera may be a camera commonly used by a user.

By disposing the following for the electronic device provided in an embodiment of this application: a housing, where the housing is provided with a light transmission hole and an opening, the light transmission hole is disposed on a first side of the housing, the opening is disposed on a second side of the housing, and the first side and the second side are adjacent sides; a camera module disposed in the housing, where the camera module includes a first camera and a second camera; and a driving mechanism, connected to the camera module and configured to drive the camera module to move between a first position and a second position, where in a case that the camera module is located at the first position, the first camera is opposite to the light transmission hole; and in a case that the camera module is located at the second position, the first camera at least partially extends out of the housing from the opening, and the second camera is opposite to the light transmission hole, openings can be disposed for only some cameras (for example, the foregoing light transmission hole is disposed, which is an action here, but does not refer to the opening 3), and the remaining cameras are hidden in the housing. Therefore, openings at camera positions and a convex area of a camera decoration part can be reduced, structural strength of the housing can be increased, a possibility of breaking or deformation can be reduced, and a processing technology can be simplified.

The first camera and the second camera can be disposed on a same base or different bases, and the following two examples are provided in this embodiment of this application.

In a first example, as shown in FIG. 2 to FIG. 6, the first camera 7 and the second camera 8 are disposed on a first base 12. The driving mechanism 6 drives the first base 12 to move along a first direction; where the first direction is a direction in which the first camera 7 extends out of the housing 1. This way, it can be ensured that the first camera and the second camera can be accurately controlled to move simultaneously.

Figure 4:
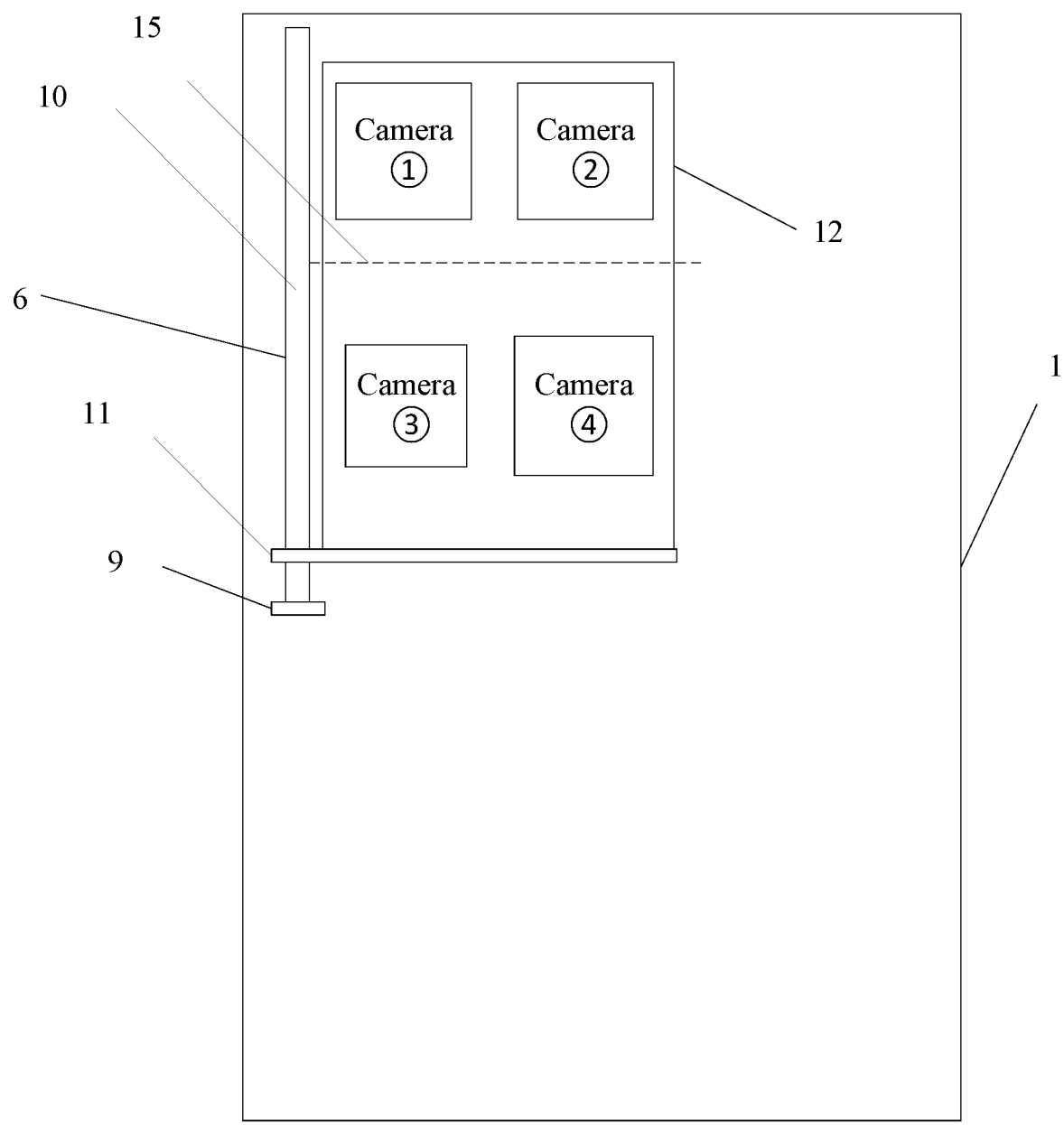
FIG. 4 is a third schematic structural diagram of the electronic device according to an embodiment of this application.
Figure 5:
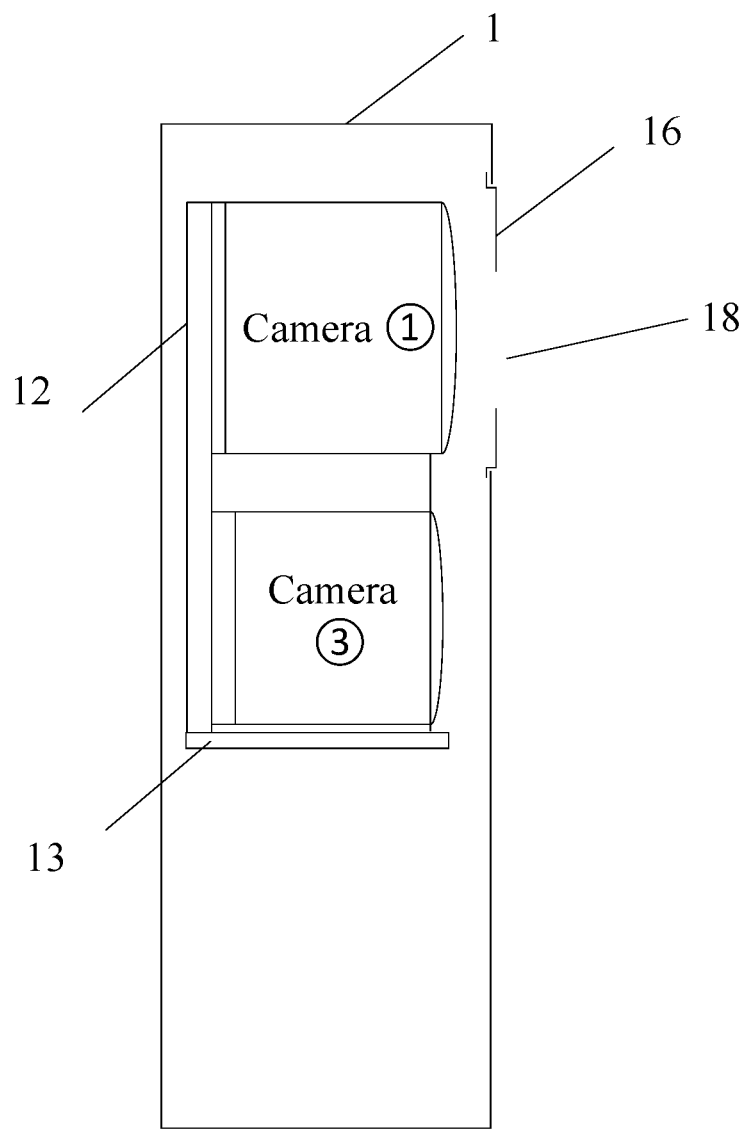
FIG. 5 is a fourth schematic structural diagram of the electronic device according to an embodiment of this application.
Figure 6:
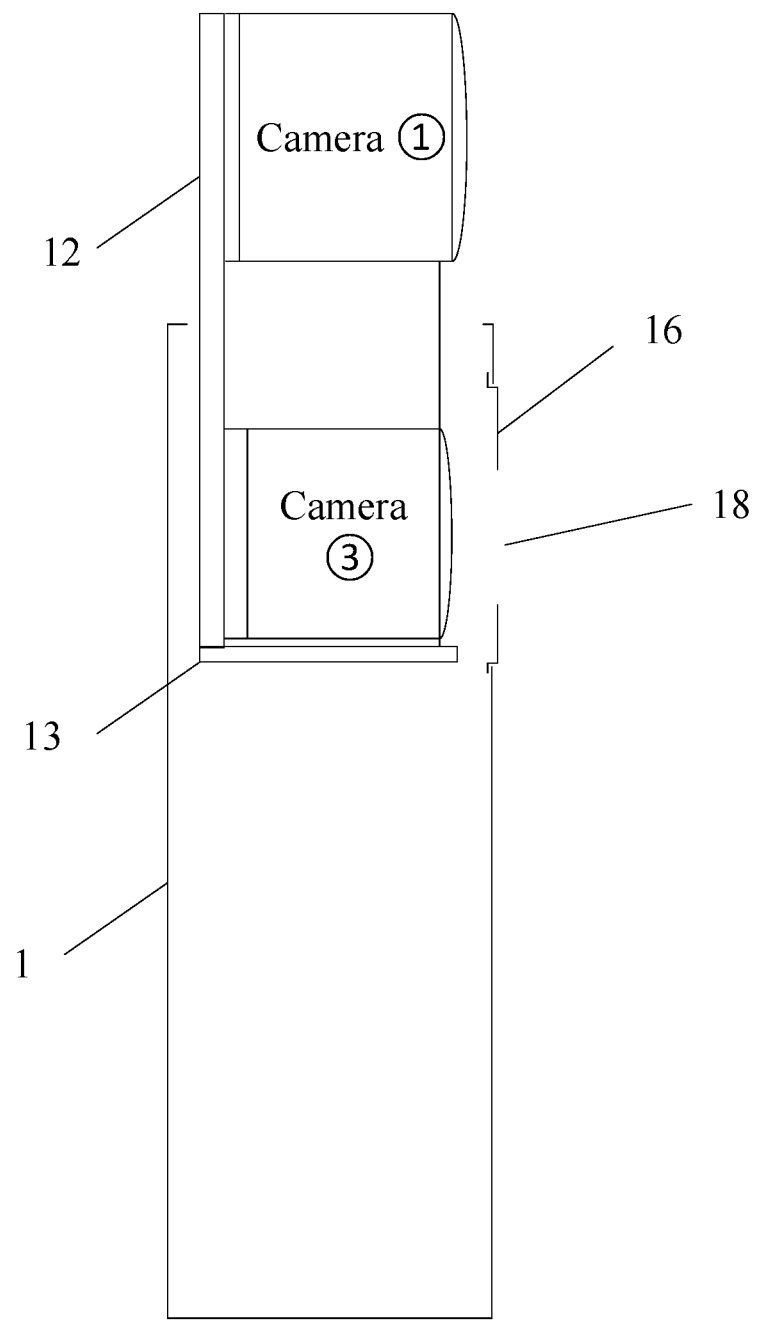
FIG. 6 is a fifth schematic structural diagram of the electronic device according to an embodiment of this application.

As shown in FIG. 4 to FIG. 6, the driving mechanism includes a motor 9, a screw threaded stud 10, and a nut 11. The motor 9 is fixedly connected to the screw threaded stud 10. The screw threaded stud 10 matches and is connected to the nut 11, and the nut 11 can move up and down relative to the screw threaded stud 10. The nut 11 is fixedly connected to the first base 12. This way, it can be ensured that the camera can move stably.

As shown in FIG. 4 to FIG. 6, the driving mechanism further includes a nut connection block 13. The nut 11 and the first base 12 are fixedly connected by the nut connection block 13. This way, the connection strength between the nut and the first base can be further ensured.

In a second example (not shown in the figures), the first camera is disposed on a second base, the second camera is disposed on a third base, and the driving mechanism drives the second base and the third base to move. This way, the first camera and the second camera can be controlled to move over different distances.

In some embodiments, the driving mechanism drives the second base and the third base to move along a first direction simultaneously. The first direction is a direction in which the first camera extends out of the housing, and a distance that the second base moves along the first direction is greater than a distance that the third base moves along the first direction. This way, it can be ensured that the first camera extends out of the housing and the second camera is aligned with the light transmission hole.

The driving mechanism drives the second base to move along a first direction, and the driving mechanism drives the third base to move along a second direction. The first direction is a direction in which the first camera extends out of the housing, and the second direction is different from the first direction. This way, it can be ensured that the movement of the camera can be controlled in more diversified manners.

In some embodiments, the driving mechanism includes a motor, a screw threaded stud, and at least two nuts. The motor is fixedly connected to the screw threaded stud. The screw threaded stud matches and is connected to the at least two nuts, and the at least two nuts can move up and down relative to the screw threaded stud. The second base and the third base are respectively fixedly connected to different nuts. This way, it can be ensured that the camera can move stably.

In this embodiment of this application, image collection parameters of the first camera and the second camera are different. For example, the first camera is a color camera configured to collect color images, and the second camera is a black-and-white camera; or the first camera is a wide-angle camera, and the second camera is a TOF camera. Parameters configured for the first camera and the second camera are different, and proper cameras can be flexibly selected according user's demands, to achieve more diversified photographing effects.

The electronic device provided in this embodiment of this application will be further explained below. For example, the camera module is a back camera module (that is, a rear camera module), and includes four cameras, which are divided into two groups (that is, the first camera and the second camera respectively include two cameras), and the first camera and the second camera are both disposed on the first base.

As shown in FIG. 2 to FIG. 6, an opening is disposed only for a commonly used camera (that is, the foregoing first camera 7) of the electronic device, and another camera (that is, the foregoing second camera 8) that is not commonly used is hidden under a rear cover (that is, in the foregoing housing 1), so that a light transmission hole 2 on the rear cover and an area of a camera decoration part 5 can be reduced. When the user needs to use the camera that is not commonly used, the user may wholly push the camera of the housing 1 in a telescopic manner, so that the camera hidden under the rear cover can be aligned with a position of an opening for the commonly used camera, and then multiple cameras can work simultaneously in a combined manner.

Figure 2:
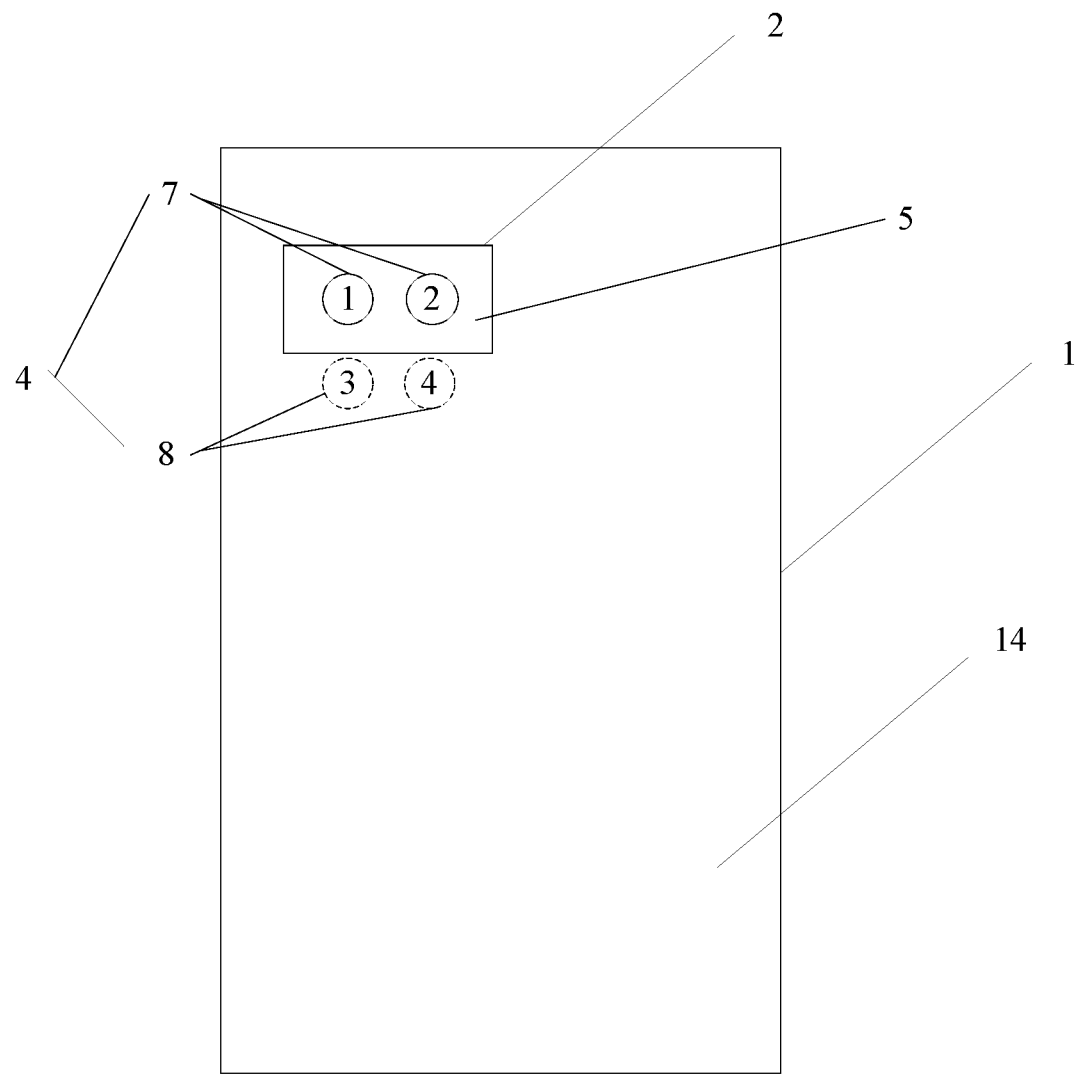
FIG. 2 is a first schematic structural diagram of an electronic device according to an embodiment of this application.

As shown in FIG. 2, a solution provided in an embodiment of this application includes four cameras, a camera ①, camera ②, camera ③, and camera ④. The camera ① and camera ② are commonly used cameras by the user. Their original states are below a camera decoration part 5. The two cameras are aligned with the light transmission hole 2 and form the foregoing first camera 7. The camera ③ and camera ④ are cameras that are not commonly used by the user and are under the rear cover of the electronic device in an original state, and form the foregoing second camera 8. Please see FIG. 2 for a back view of the complete device. A numeral 5 in the figures indicates the camera decoration part, and a numeral 14 indicates a back of the electronic device, which apply to FIG. 3 to FIG. 6. Through the structure provided in the embodiment of this application, an area of an opening at the rear cover can be reduced, structural performance can be enhanced, and aesthetic appearance can be improved.

Figure 3:
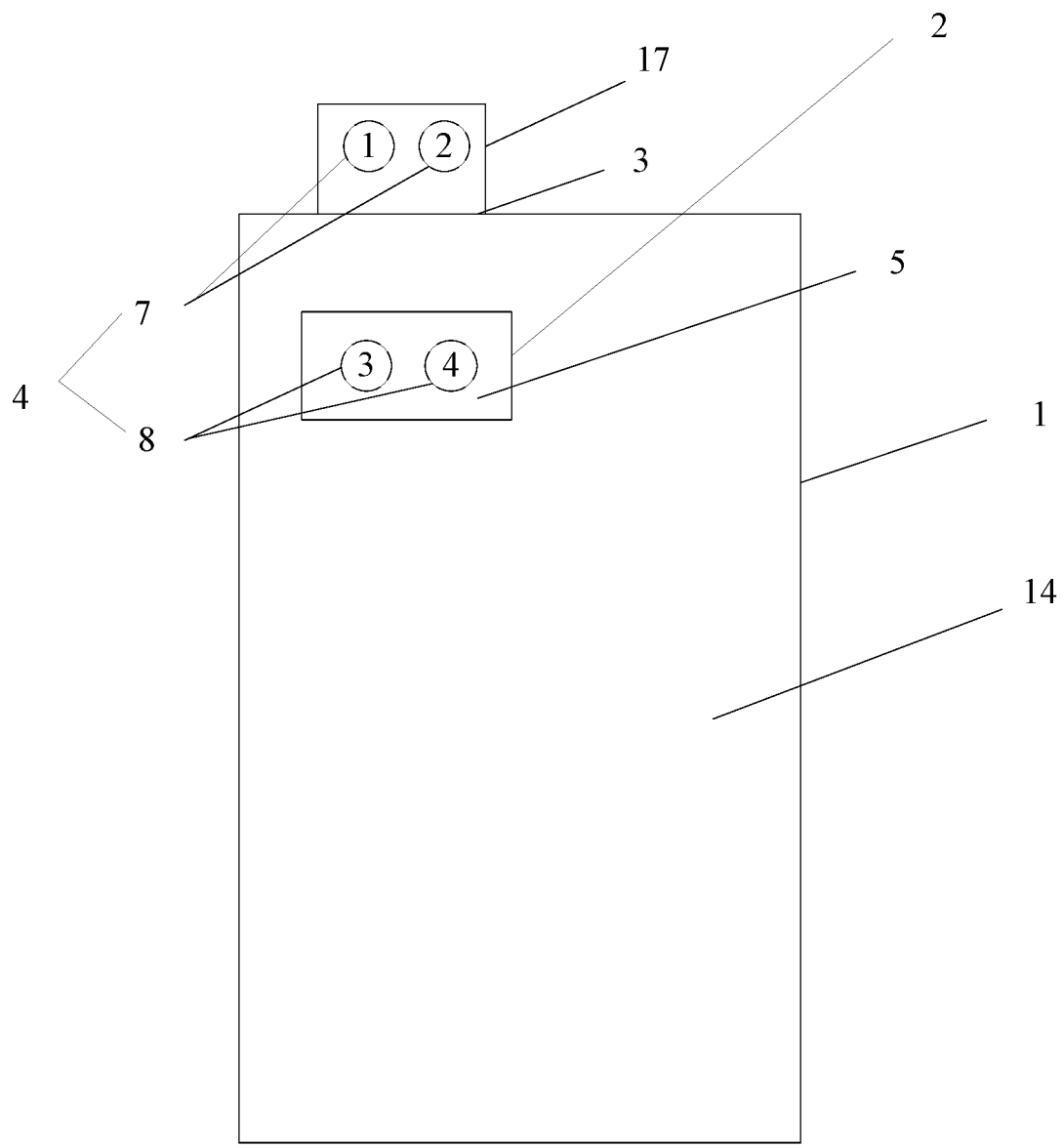
FIG. 3 is a second schematic structural diagram of the electronic device according to an embodiment of this application.

In this solution, when the user needs to use the camera ③ and the camera ④, a telescopic camera principle can be adopted to push the camera ① and the camera ② out of the housing 1 through a mechanical structure (that is, the foregoing driving mechanism 6), and the camera ③ and the camera ④ are driven to positions at which the camera ① and the camera ② are originally located, so as to be aligned with the light transmission hole 2, and achieve combined photographing by multiple cameras, and a schematic diagram is shown in FIG. 3 (a camera holder 17 pops up in FIG. 3, so that the camera ① and the camera ② are outside the housing 1).

Details of an exemplary structure in this solution are as follows:

FIG. 4 is a front view of a structure in this solution, including the following key components: a motor (that is, the motor 9) at the bottom, configured to drive a screw threaded stud 10 to rotate; the screw threaded stud 10, which is a stud engraved with screw threads; a nut 11, which is a moving part, where the nut 11 cannot rotate with the screw threaded stud 10 (there is no space in a transverse direction), and can only move up and down with a direction of a thread when the motor 9 drives the screw threaded stud 10 to rotate; a module fixing block (that is, the first base 12), configured to connect the camera module 4 and fix a relative position of the camera module 4, and be fixed on the nut 11. A numeral 15 in the figure indicates a lower edge of the camera decoration part.

FIG. 5 and FIG. 6 are schematic cross-sectional views perpendicular to a direction of a display screen, which show a state of a camera module before and after extending and retracting. It can be seen that in a default state of the camera module, a camera ① (and a camera ②) are facing a light transmission hole 2 of a camera decoration part 5 on a rear cover. In this case, a camera ③ (and a camera ④) are inside the rear cover of the electronic device, the camera ③ (and the camera ④) cannot be seen from the outside. When a user uses the camera ① and the camera ② normally, the camera module is in an original state (that is, the camera module 4 is at a first position and the foregoing driving mechanism 6 is in a non-working state), and the camera is not required to be lifted. A numeral 16 in the figures indicates an upper edge of the camera decoration part, and a reference numeral 18 indicates an opening of the camera decoration part. In an embodiment of this application, when a camera collects an image, the camera is also aligned with the opening 18 of the camera decoration part, and the camera decoration 5 and the light transmission hole 2 on the housing 1 are mutually matched, so that the camera can collect an image normally.

When the user needs to use the camera ③ and the camera ④, the user can select a corresponding photographing function (such as blur or macro lens) through an upper switch of the electronic device, that is, determine an image obtaining parameter; In this case, the electronic device can control a motor 9 to push the camera out of the housing 1, so that the camera ③ and the camera ④ face the light transmission hole 2 of the camera decoration part 5, and cameras ①, ②, ③, and ④ can all perform imaging normally (that is, collect images separately), and a fusion function of multiple cameras can be achieved.

It can be known from the foregoing that, a solution provided in an embodiment of this application is as follows: through a principle of lifting a camera, an area of the camera decoration part and an opening for the camera can be better reduced, structural performance can be enhanced, and a better appearance can be achieved. In addition, a front camera is applied in this solution, so that a screen-to-body ratio of a front screen in a multi-front camera solution can be better increased.

Here, when the solution provided in this embodiment of this application is implemented, a type of camera is not restricted to a rear camera, may be a front camera or another type of camera. The quantity of the cameras is also not restricted to four, may be less than or greater than four, which is not limited herein.

Figure 7:
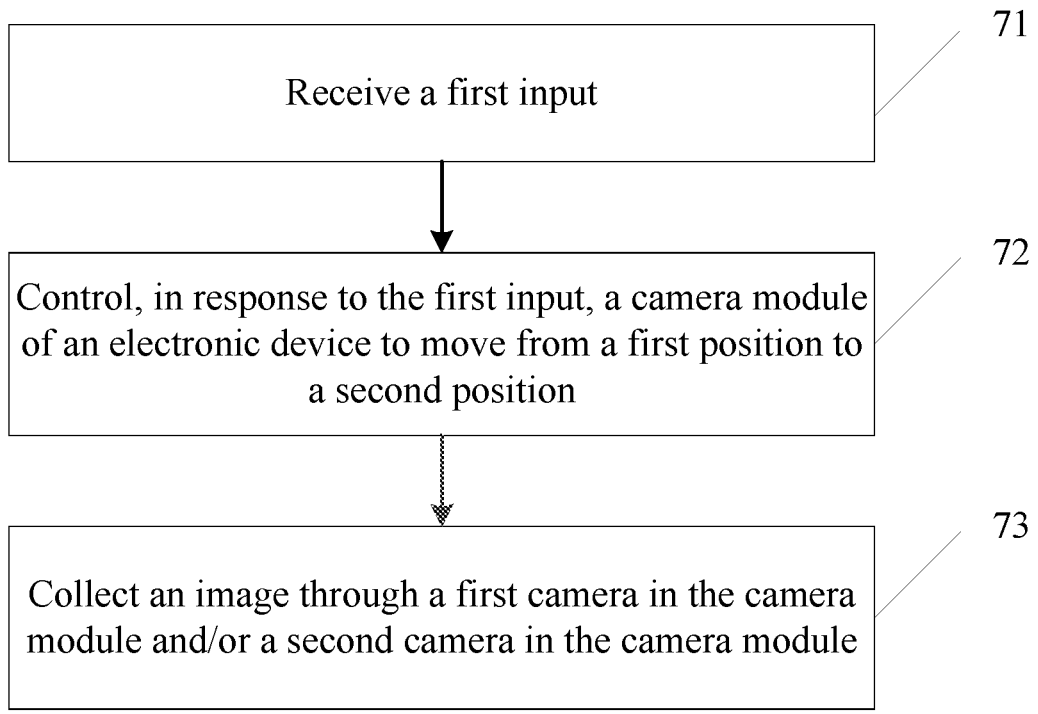
FIG. 7 is a schematic flowchart of an image collection method according to an embodiment of this application.

An embodiment of this application further provides an image collection method, applied to the foregoing electronic device. As shown in FIG. 7, the method includes:

Step 71: Receive a first input.

The first input may be an input for indicating an image obtaining parameter, and the image obtaining parameter may include various parameters of an image type required by a user.

Step 72: Control, in response to the first input, a camera module of the electronic device, to move from a first position to a second position.

In some embodiments, the controlling, in response to the first input, a camera module of the electronic device, to move from a first position to a second position includes: determining a required camera in response to the first input; determining, according to a state of a driving mechanism of the electronic device, whether the required camera can collect an image; controlling, in a case that the image can be collected, the required camera to collect the image; and controlling, in a case that the image cannot be collected, the driving mechanism to drive the camera module to move from the first position to the second position. This way, it can be ensured that a required camera module can be exposed, and another unnecessary camera module can be still in a housing of the electronic device, without affecting image collection.

The required camera may include at least one of a camera commonly used by the user or a camera not commonly used by the user.

A state of a lifting mechanism may be: whether the lifting mechanism is in a working state and which working state the lifting mechanism is in. For a correspondence between the state of the lifting mechanism and a position of the camera module in the electronic device, one of the state or the position can be obtained according to the other.

In some embodiments, the determining, according to a state of a driving mechanism of the electronic device, whether the required camera can collect an image includes: determining, according to the state of the driving mechanism of the electronic device, whether the required camera is located outside the housing of the electronic device or aligned with a light transmission hole on the housing (and the light transmission hole can be used normally); and if yes, determining that the required camera can collect an image; if no, determining that the required camera cannot collect an image. This way, it can be directly and accurately determined that whether the required camera module can collect an image normally in a current state.

Step 73: Collect an image through a first camera in the camera module and/or a second camera in the camera module.

It can be known from the foregoing that in the image collection method provided in the embodiment of this application: receiving a first input; controlling, in response to the first input, a camera module of the electronic device to move from a first position to a second position; and collecting an image through a first camera in the camera module and/or a second camera in the camera module, it can be controlled that the required camera be in a state of being capable of collecting an image and another camera be not exposed and in the housing of the electronic device. Therefore, openings can be disposed for only some cameras, and the remaining cameras are hidden in the housing. Therefore, openings at camera positions and a convex area of the camera decoration part can be reduced, the structural strength of the housing can be increased, the possibility of breaking or deformation can be reduced, and processing technology can be simplified.

It should be noted that in the image collection method provided in the embodiment of this application, an executing body may be an image collection apparatus or a control module in the image collection apparatus for executing the image collection method. In an embodiment of this application, the image collection method provided in the embodiment of this application is described by using the image collection apparatus executing the image collection method as an example.

Figure 8:
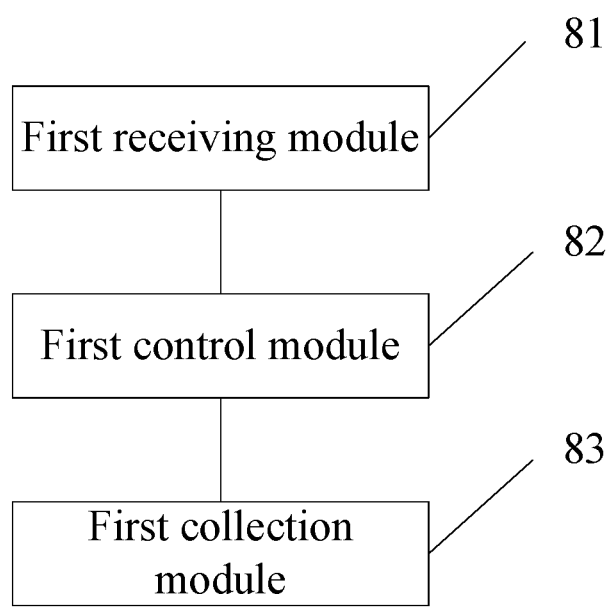
FIG. 8 is a schematic structural diagram of an image collection apparatus according to an embodiment of this application.

An embodiment of this application further provides an image collection apparatus, applied to the foregoing electronic device. As shown in FIG. 8, the apparatus includes:
a first receiving module 81, configured to receive a first input;
a first control module 82, configured to control, in response to the first input, a camera module of the electronic device to move from a first position to a second position; and
a first collection module 83, configured to collect an image through a first camera in the camera module and/or a second camera in the camera module.

In some embodiments, the first control module includes: a first determining sub-module, configured to determine a required camera in response to the first input; a second determining sub-module, configured to determine, according to a state of a driving mechanism of the electronic device, whether the required camera can collect an image; a first control sub-module, configured to control, in a case that the image can be collected, the required camera to collect the image; and a second control sub-module, configured to control, in a case that the image cannot be collected, the driving mechanism to drive the camera module to move from the first position to the second position. This way, it can be ensured that a required camera is exposed, and another unnecessary camera is still in a housing of the electronic device, without affecting image collection.

The image collection apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The image collection apparatus in this embodiment of this application may be an apparatus with an operating system. The operating system may be an Android operating system, may be an iOS operating system, or may be another possible operating system, which is not specifically limited in the embodiments of the present application.

The image collection apparatus provided in this embodiment of this application can implement the processes implemented by the image collection apparatus in the method embodiment in FIG. 7. To avoid repetition, details are not described herein again.

For the image collection apparatus provided in the embodiment of this application, through the following: receiving the first input; controlling, in response to the first input, a camera module of the electronic device to move from a first position to a second position; and collecting an image through a first camera in the camera module and/or a second camera in the camera module, it can be controlled that the required camera be in a state of being capable of collecting an image and another camera be not exposed and in the housing of the electronic device. Therefore, openings can be disposed for only some cameras, and the remaining cameras are hidden in the housing. Therefore, openings at camera positions and a convex area of the camera decoration part can be reduced, structural strength of the housing can be increased, a possibility of breaking or deformation can be reduced, and a processing technology can be simplified.

Figure 9:
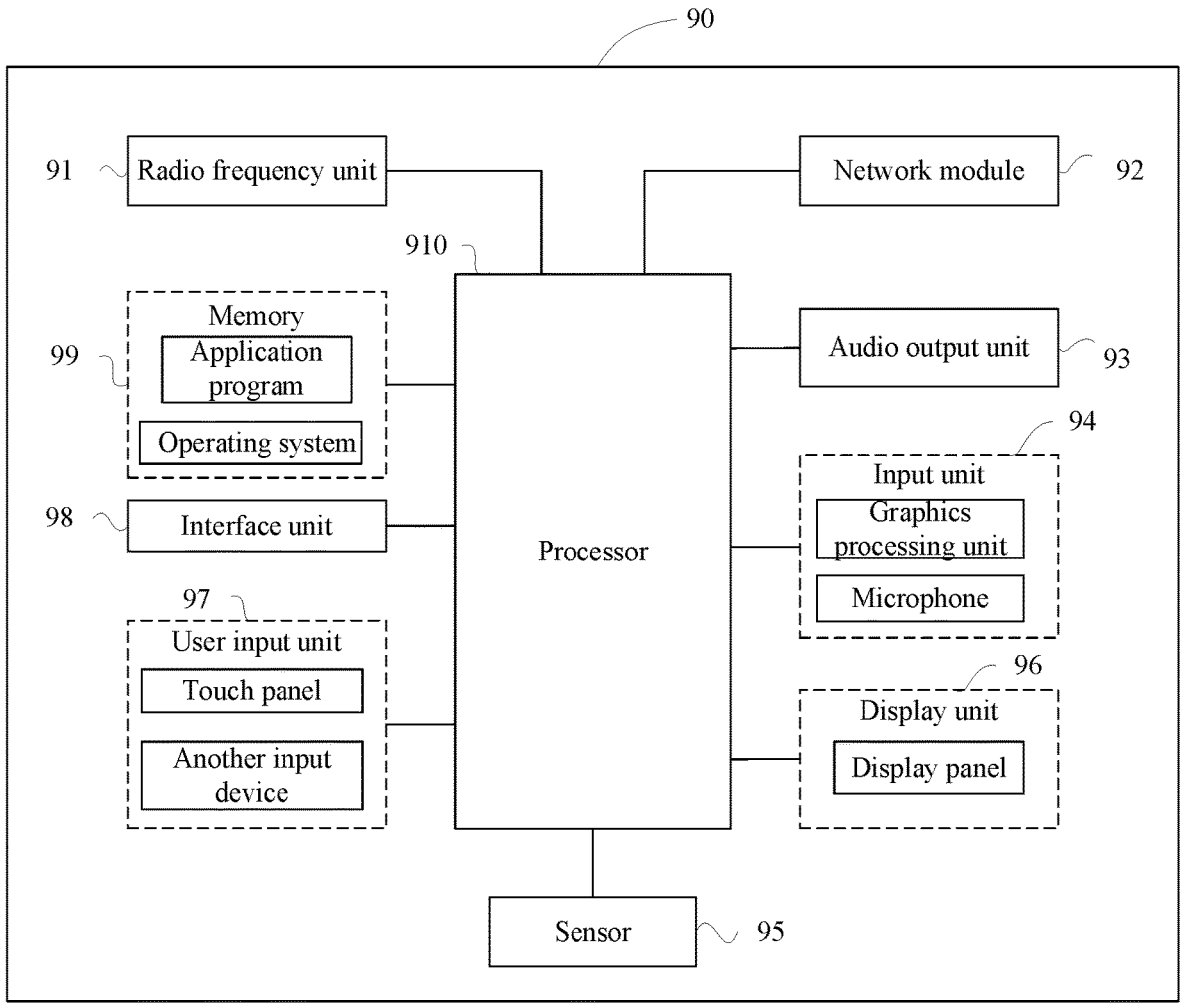
FIG. 9 is a sixth schematic structural diagram of the electronic device according to an embodiment of this application.

An embodiment of this application further provides an electronic device. As shown in FIG. 9, the electronic device includes a processor 910, a memory 99, and a program or an instruction that is stored in the memory 99 and that can be run on the processor 910. When the program or the instruction is executed by the processor 910, the processes of the foregoing embodiments of the image collection method are implemented and a same technical effect can be achieved. To avoid repetition, details are not described herein again.

It should be noted that the electronic device in this embodiment of this application includes the foregoing mobile electronic device and the foregoing non-mobile electronic device.

FIG. 9 is a schematic structural diagram of an electronic device according to an embodiment of this application.

The electronic device 90 includes but is not limited to components such as a radio frequency unit 91, a network module 92, an audio output unit 93, an input unit 94, a sensor 95, a display unit 96, a user input unit 97, an interface unit 98, a memory 99, and a processor 910.

A person skilled in the art can understand that the electronic device 90 may further include a power supply (for example, a battery) that supplies power to the components. The power supply may be logically connected to the processor 910 by using a power management system, so as to implement functions such as charging management, discharging management, and power consumption management by using the power management system. The electronic device is not limited to the electronic device structure shown in FIG. 9. The electronic device may include more or fewer components than those shown in the figure, or combine some of the components, or arrange the components differently. Details are not described herein.

The processor 910 is configured to: receive a first input through the user input unit 97; control, in response to the first input, a camera module of the electronic device to move from a first position to a second position; and collect an image through a first camera in the camera module and/or a second camera in the camera module.

In an embodiment of this application, through the following: receiving a first input; controlling, in response to the first input, a camera module of the electronic device to move from a first position to a second position; and collecting an image through a first camera in the camera module and/or a second camera in the camera module, it can be controlled that the required camera be in a state of being capable of collecting an image and another camera be not exposed and in the housing of the electronic device. Therefore, openings can be disposed for only some cameras, and the remaining cameras are hidden in the housing. Therefore, openings at camera positions and a convex area of the camera decoration part can be reduced, structural strength of the housing can be increased, a possibility of breaking or deformation can be reduced, and a processing technology can be simplified.

In some embodiments, the processor 910 is configured to: determine a required camera in response to the first input; determine, according to a state of a driving mechanism of the electronic device, whether the required camera can collect an image; control, in a case that the image can be collected, the required camera to collect the image; and controlling, in a case that the image cannot be collected, the driving mechanism to drive the camera module to move from the first position to the second position.

This way, it can be ensured that a required camera is exposed, and another unnecessary camera is still in a housing of the electronic device, without affecting image collection.

An embodiment of this application further provides a readable storage medium, where the readable storage medium stores a program or an instruction, and when the program or the instruction is executed by a processor, the processes of the foregoing embodiments of the image collection are implemented, and a same technical effect can be achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of this application further provides a chip. The chip includes a processor and a communications interface, and the communications interface is coupled to the processor. The processor is configured to run a program or an instruction to implement various processes of the foregoing embodiments of the image collection method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An electronic device, comprising:
    a housing, wherein the housing is provided with a light transmission hole and an opening, the light transmission hole is disposed on a first side of the housing, the opening is disposed on a second side of the housing, and the first side and the second side are adjacent sides;
    a camera module disposed in the housing, wherein the camera module comprises a first camera and a second camera; and
    a driving mechanism, connected to the camera module and configured to drive the camera module to move between a first position and a second position,
        wherein when the camera module is located at the first position, the first camera is opposite to the light transmission hole; and
        when the camera module is located at the second position, the first camera at least partially extends out of the housing from the opening, and the second camera is opposite to the light transmission hole.

2. The electronic device according to claim 1, wherein the first camera and the second camera are disposed on a first base; and the driving mechanism drives the first base to move along a first direction,
    wherein the first direction is a direction in which the first camera extends out of the housing.

3. The electronic device according to claim 2, wherein the driving mechanism comprises a motor, a screw threaded stud, and a nut,
    wherein the motor is fixedly connected to the screw threaded stud, the screw threaded stud matches and is connected to the nut, the nut is movable up and down relative to the screw threaded stud, and the nut is fixedly connected to the first base.

4. The electronic device according to claim 1, wherein the first camera is disposed on a second base, the second camera is disposed on a third base, and the driving mechanism drives the second base and the third base to move.

5. The electronic device according to claim 4, wherein the driving mechanism drives the second base and the third base to move along a first direction simultaneously,
    wherein the first direction is a direction in which the first camera extends out of the housing, and a distance that the second base moves along the first direction is greater than a distance that the third base moves along the first direction.

6. The electronic device according to claim 4, wherein the driving mechanism drives the second base to move along a first direction, and the driving mechanism drives the third base to move along a second direction,
    wherein the first direction is a direction in which the first camera extends out of the housing, and the second direction is different from the first direction.

7. The electronic device according to claim 4, wherein the driving mechanism comprises a motor, a screw threaded stud, and at least two nuts,
    wherein the motor is fixedly connected to the screw threaded stud;
    the screw threaded stud matches and is connected to the at least two nuts, and the at least two nuts are movable up and down relative to the screw threaded stud; and
    the second base and the third base are respectively fixedly connected to different nuts.

8. The electronic device according to claim 1, wherein image collection parameters of the first camera and the second camera are different.

9. An image collection method, performed by the electronic device according to claim 1, comprising:
    receiving a first input;
    controlling, in response to the first input, a camera module of the electronic device to move from a first position to a second position; and
    collecting an image through a first camera in the camera module or a second camera in the camera module.

10. The image collection method according to claim 9, wherein the controlling, in response to the first input, a camera module of the electronic device to move from a first position to a second position comprises:
    determining a required camera in response to the first input;
    determining, according to a state of a driving mechanism of the electronic device, whether the required camera can collect an image;
    controlling the required camera to collect the image when the image is collectible by the required camera; or
    controlling the driving mechanism to drive the camera module to move from the first position to the second position when the image is not collectible by the required camera.

11. A non-transitory computer-readable storage medium, storing a program, wherein the program, when executed by a processor, causes the processor to perform the image collection method according to claim 9.

12. The non-transitory computer-readable storage medium according to claim 11, wherein the controlling, in response to the first input, a camera module of the electronic device to move from a first position to a second position comprises:
    determining a required camera in response to the first input;

determining, according to a state of a driving mechanism of the electronic device, whether the required camera can collect an image;

controlling the required camera to collect the image when the image is collectible by the required camera; or controlling the driving mechanism to drive the camera module to move from the first position to the second position when the image is not collectible by the required camera.

* * * * *